(12) United States Patent
Malherbe et al.

(10) Patent No.: US 7,375,502 B2
(45) Date of Patent: *May 20, 2008

(54) SECURE SUPPLY OF AN INTEGRATED CIRCUIT

(75) Inventors: Alexandre Malherbe, Trets (FR);
Edith Kussener, Le Revest les Eaux (FR); Vincent Telandro, Toulon (FR)

(73) Assignees: STMicroelectronics S.A., Montrouge (FR); Universite D.Aix-Marseille I, Marseille Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/348,792

(22) Filed: Feb. 7, 2006

(65) Prior Publication Data
US 2006/0176032 A1 Aug. 10, 2006

(30) Foreign Application Priority Data
Feb. 8, 2005 (FR) .................................. 05 50366

(51) Int. Cl.
*G05F 1/59* (2006.01)
(52) U.S. Cl. .................... 323/268; 323/273; 363/60
(58) Field of Classification Search ................ 307/110; 323/268, 273; 363/59, 60, 65
See application file for complete search history.

(56) References Cited

U.S. PATENT DOCUMENTS

| 4,502,152 | A | * | 2/1985 | Sinclair | 455/73 |
| 5,262,712 | A | * | 11/1993 | Klotzig et al. | 323/224 |
| 6,320,770 | B1 | | 11/2001 | Feuser | |
| 6,507,913 | B1 | | 1/2003 | Shamir | |
| 6,617,832 | B1 | * | 9/2003 | Kobayashi | 323/266 |
| 2003/0118190 | A1 | | 6/2003 | Sedlak et al. | |
| 2006/0176033 | A1 | * | 8/2006 | Malherbe et al. | 323/268 |

OTHER PUBLICATIONS

French Search Report from French Patent Application 05/50366, filed Feb. 8, 2005.
French Search Report from French Patent Application 05/50367, filed Feb. 8, 2005.

* cited by examiner

*Primary Examiner*—Jeffrey Sterrett
(74) *Attorney, Agent, or Firm*—Lisa K. Jorgensen; James H. Morris; Wolf, Greenfield & Sacks, P.C.

(57) ABSTRACT

A method and a circuit for scrambling the current signature of a load comprising at least one integrated circuit executing digital processings, including supplying at least the integrated circuit from a supply voltage external to the circuit by combining a current provided by a first linear regulator with a current provided by at least one capacitive switched-mode power supply circuit with one or several switched capacitances.

16 Claims, 6 Drawing Sheets

SECURE SUPPLY OF AN INTEGRATED CIRCUIT

BACKGROUND OF THE INVENTION

1. Field of the Invention

The present invention generally relates to integrated circuits and, more specifically, to the protection of algorithms and/or digital data handled by an integrated circuit against possible attacks by analysis of the circuit power consumption.

An example of application of the present invention is the field of smart cards and other electronic tags with or without contacts.

2. Discussion of the Related Art

The power consumption of an electronic circuit, especially of a digital data processing circuit, varies according to the activity of this circuit and more specifically to the executed calculations. When a circuit executes an algorithm that must remain secret or manipulates secret quantities or data, it is generally desired to avoid a hacking by analysis of the circuit power consumption. Such a hacking uses so-called SPA (Simple Power Analysis) or DPA (Differential Power Analysis) attacks which examine the current signature of the circuit to discover its operation or the secret data.

FIG. 1 very schematically shows a card 1 with a chip 2 with contacts of the type to which the present invention applies. Card 1 is formed of a wafer generally made of plastic matter on which is placed an integrated circuit chip 2 accessible from the outside by electric contacts 3 among which at least two contacts 31 and 32 of application of a supply voltage when the card is introduced into the reader.

FIG. 2 shows a second example of a smart card 1' to which the present invention applies. It is a contactless card generally called an electromagnetic transponder. Card 1' comprises an integrated circuit chip 2' having two input terminals 31' and 32' connected to the two respective ends of a conductive track 33, supported by card 1' and forming an antenna. Antenna 33 belongs to a resonant circuit of transponder 1' to collect not only information but also a remote-supply power when the card is close to a terminal generating an electromagnetic field.

The two systems with and without contacts may be present on the same card, and even on the same chip.

Be it in a card with or without contacts, the chip integrates an element for regulating the supply voltage of its internal circuits, among which the calculation circuit(s) (generally, a microcontroller). The chip is considered as a secure area from the point of view of the preservation of the data (algorithms and data) that it contains, such data being only accessible from the means of chip communication with the outside (contacts 3, 31 and 32 in the case of a card with contacts and radio-frequency signal or terminals 31' and 32' in the case of a contactless card).

FIG. 3 very schematically shows in the form of blocks a conventional example of a linear regulator 4 providing, from a voltage Vps present between terminals 31 and 32, a regulated D.C. supply voltage Vdd of a load 29 (L) formed by the circuits internal to the chip apart from regulator 4.

In the case of a card (1, FIG. 1) with contacts, terminals 31 and 32 are directly connected to the terminals of application of the supply voltage of regulator 4, as shown in full lines in FIG. 3.

In the case, shown in dotted lines in FIG. 3, of a contactless card (1', FIG. 2), external access terminals 31' and 32' of the chip to which is connected antenna 33 (symbolized by an inductance of the oscillating circuit in FIG. 3) are connected to the A.C. input terminals of a rectifying bridge 24. A capacitor 23 taking part in the oscillating circuit connects terminals 31' and 32', and the rectified output terminals of bridge 24 are generally connected by a capacitor 25. Terminals 31 and 32 of application of voltage Vps to the input of regulator 4 are connected to the rectified output terminals of bridge 24. Signals (not shown) are sampled upstream of the regulator (at the input or at the output of bridge 24), among others, to recover a clock signal of the downstream microcontroller.

Regulator 4 uses a switch 40 (typically, a P-channel MOS transistor) having its source directly connected to a terminal 41 of application of the positive voltage (terminal 31) of supply voltage Vps and having its source directly connected to an output terminal 48 of regulator 4 providing the positive potential of voltage Vdd. The gate of transistor 40 is connected to the output of a transconductance amplifier 43 to regulate voltage Vdd according to a reference value. This reference value is provided by a circuit 44 (BG) for generating a reference voltage (generally designated as a bandgap voltage) on a reference input (for example, non-inverting) of amplifier 43. The measurement input (for example, inverting) of amplifier 43 is connected to the midpoint of a dividing bridge formed of two resistors 45 and 46 in series between terminal 48 and a terminal 42 of application of the reference voltage (ground) of input voltage Vps. Amplifier 43 and circuit 44 are supplied between terminals 41 and 42 (voltage Vps).

In operation, input current Ips on supply pad 31 is directly proportional to input current Idd on internal supply node 21 of load 29. Accordingly, an analysis of current Ips enables deducing the current signature of the load.

On the side of reference terminal 32, current Iss coming out of the integrated circuit through pad 32 directly depends on the current coming out from the load through its reference pad 22. Although current Iss generally contains less information than current Ips due to the integration performed by the ground plane capacitances, an analysis of the current signature of the integrated circuit by examination of current Iss is possible.

To thwart hacking attempts by analysis of the power consumption of an integrated circuit, a first known so-called software technique consists of masking the execution of the critical operations from the viewpoint of the data or algorithm security with random quantities input at different steps of the processing.

A second known so-called hardware technique consists of duplicating the digital processing cells to perform several calculations in parallel and thus mask the critical calculations.

Whatever the used technique, the electric signal representative of the current signature of the algorithm remains present, even masked, in currents Ips and Iss.

The present invention will be described hereafter in relation with an example of application to a chip (for example, of a smart card) integrating all the circuits, but it more generally applies to any circuit or electronic system integrating, in a secure area, a circuit likely to undergo hacking attempts by analysis of its consumption.

SUMMARY OF THE INVENTION

The present invention aims at overcoming all or part of the disadvantages of known techniques to mask the execution of digital processings by an integrated circuit against analyses of its power consumption.

The present invention more specifically aims at providing a solution compatible with an integration of all the circuits in a same chip.

The present invention also aims at providing a solution requiring no modification of the supplied load.

According to a first aspect, the present invention aims at scrambling the current signature of the digital processings at least on the integrated circuit supply side.

According to a second aspect, the present invention aims at scrambling the current signature of the digital processing on the integrated circuit ground side.

To achieve all or part of these objects, as well as others, the present invention provides an integrated circuit comprising at least one first linear regulator for providing a supply voltage to an internal load from an external voltage and at least one capacitive switched-mode power supply circuit with one or several switched capacitances, in parallel with the first linear regulator and activated, at least in an operation phase of the integrated circuit, at the same time as the first linear regulator.

According to an embodiment of the present invention, said phase corresponds to a phase in which a calculation processor contained by the load is active.

According to an embodiment of the present invention, the switched-mode circuit is sized according to the difference in the integrated circuit power (current and/or voltage) consumption between its average power consumption and its power consumption during calculations executed by the processor.

According to an embodiment of the present invention, said switched-mode circuit is activated as soon as the current consumed by the load exceeds a threshold.

According to an embodiment of the present invention, said cutting circuit is permanently active.

According to an embodiment of the present invention, a second linear regulator, fast with respect to the first adaptive biasing linear regulator, is interposed between the respective outputs of the first linear regulator and of the switched-mode circuit and a first supply terminal of the load.

According to an embodiment of the present invention, said first linear regulator comprises a P-channel MOS transistor, in series with a first N-channel MOS transistor of the second linear regulator between a first terminal of application of the external voltage and a first supply terminal of the load, at least one second N-channel MOS transistor of the second linear regulator connecting an output terminal of the switched-mode circuit to said first supply terminal of the load.

According to an embodiment of the present invention, the switched-mode circuit comprises several capacitors having their charge organized at least for some of them in parallel and having their discharge organized in series.

According to an embodiment of the present invention, the switched-mode circuit is of chopper type.

According to an embodiment of the present invention, at least one first additional adaptive biasing linear regulator and at least one additional capacitive switched-mode circuit with one or several switched capacitances are interposed between a second supply terminal of the load and a second terminal of application of the external supply voltage.

According to an embodiment of the present invention, a second additional linear regulator, fast with respect to the first additional linear regulator, is interposed between the second supply terminal of the load and the respective inputs of the first additional linear regulator and of the additional switched-mode circuit.

According to an embodiment of the present invention, said second additional linear regulator comprises a first P-channel MOS transistor, in series with an N-channel MOS transistor of the first additional linear regulator between the second supply terminal of the load and the second terminal of application of the external voltage, a second P-channel MOS transistor of the second additional linear regulator connecting said second supply terminal of the load to an input terminal of the additional switched-mode circuit.

The present invention also provides a method for scrambling the current signature of a load comprising at least one integrated circuit executing digital processings, consisting of supplying at least the integrated circuit from a supply voltage external to the circuit by combining a current provided by a first linear regulator with a current provided by at least one capacitive switched-mode power supply circuit with one or several switched capacitances.

According to an embodiment of the present invention, said currents are combined, at least during a phase where the processor is activated.

According to an embodiment of the present invention, said switched-mode circuit is activated when the current surged by the load exceeds a threshold.

According to an embodiment of the present invention, said switched-mode circuit is permanently activated.

The foregoing objects, features, and advantages of the present invention, as well as others, will be discussed in detail in the following non-limiting description of specific embodiments in connection with the accompanying drawings.

DETAILED DESCRIPTION

Figure 1:
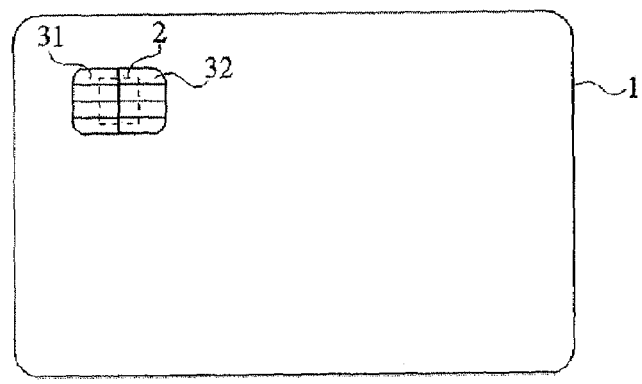
FIG. 1, previously described, very schematically shows a smart card with contacts of the type to which, as an example, the present invention applies.
Figure 2:
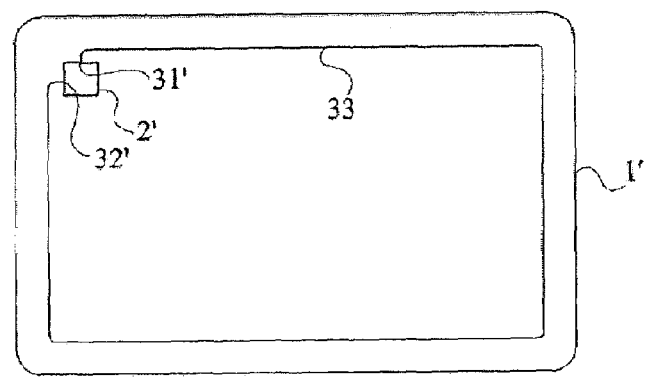
FIG. 2, previously described, very schematically shows a contactless smart card of the type to which, as an example, the present invention applies.

The same elements have been designated with the same reference numerals in the different drawings. For clarity, only those elements which are useful to the understanding of the present invention have been shown in the drawings and will be described hereafter. In particular, the details constitutive of the load having a scrambled supply or ground current have not been discussed, the present invention being compatible with any conventional load.

Figure 3:
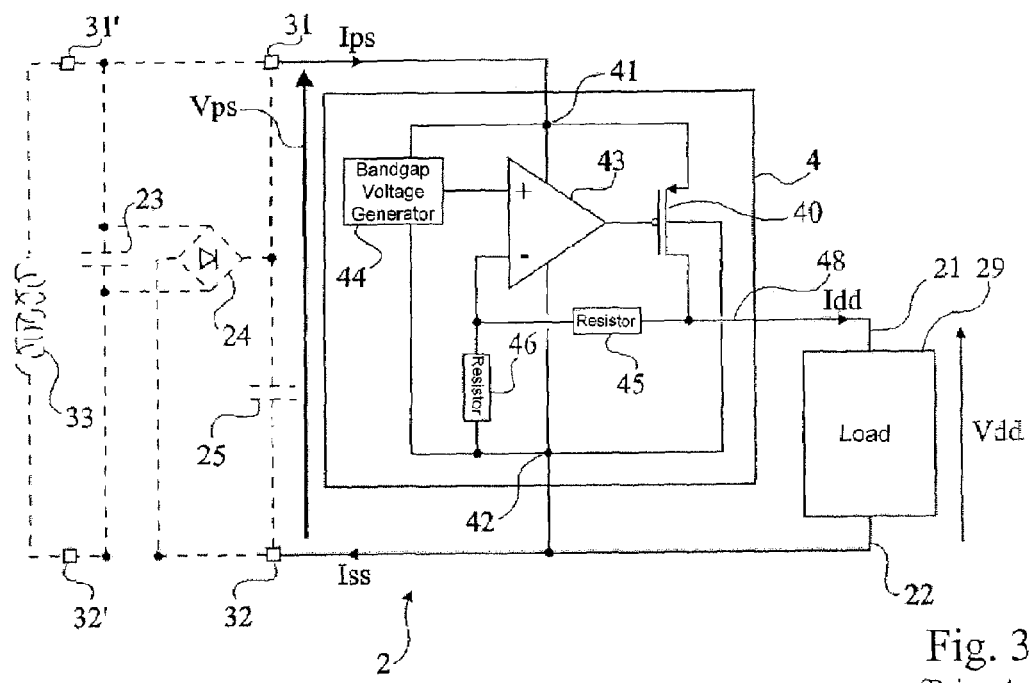
FIG. 3, previously described, shows a conventional example of a power regulator of a chip of a card with or without contact.

To mask the current signature of an integrated circuit chip, it could be devised to replace the conventional linear regulator (FIG. 3) with a step-down converter with switched capacitances.

Figure 4:
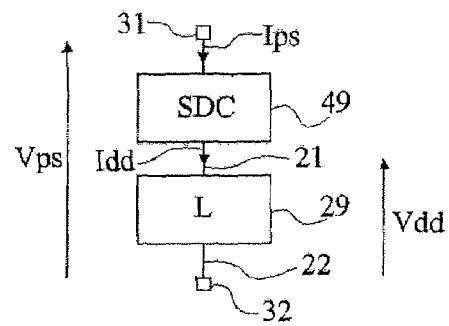
FIG. 4 very schematically shows in the form of blocks a switched-capacitance power supply.

FIG. 4 very schematically shows such a solution in the form of blocks. A circuit 49 forming a switched-capacitance step-down converter (SDC) is interposed between a terminal 31 of application of the positive potential of an external supply voltage Vps and an internal terminal 21 of application of a positive potential of a supply voltage Vdd of a load 29 (L) forming the circuits internal to the chip. The reference levels of voltages Vps and Vdd are, for example, a common ground (terminal 22 and 32 confounded).

An advantage of a switched-capacitance step-down converter is that, by the switching of capacitances between charge and discharge phases, current Ips absorbed by converter 49 on pad 31 is decorrelated from current Idd provided to load 29. Another advantage is that it provides a maximum theoretical efficiency greater than that of a linear converter. The maximum theoretical efficiency of a linear regulator is Vdd/Vps (since Idd=Ips) while that of a switched-capacitance step-down converter is (Vdd.Idd)/(Vps.Ips), that is, theoretically, 100%.

However, such a solution is not compatible with smart card miniaturization constraints. Indeed, the circuit current consumption (generally, several tens of milliamperes) would require capacitance values of several tens of nanofarads, which would generate surface areas of several square millimeters, thus making this solution non-integrable.

Further, it cannot be envisaged to form the switched-capacitance converter on a separate chip since this would make supply voltage Vdd of the load accessible to the possible hacker, thus canceling the scrambling effect of the switched capacitances on the consumed current.

Further, this brings no solution to the presence of a signature, even attenuated, on the integrated circuit ground side.

Figure 5:
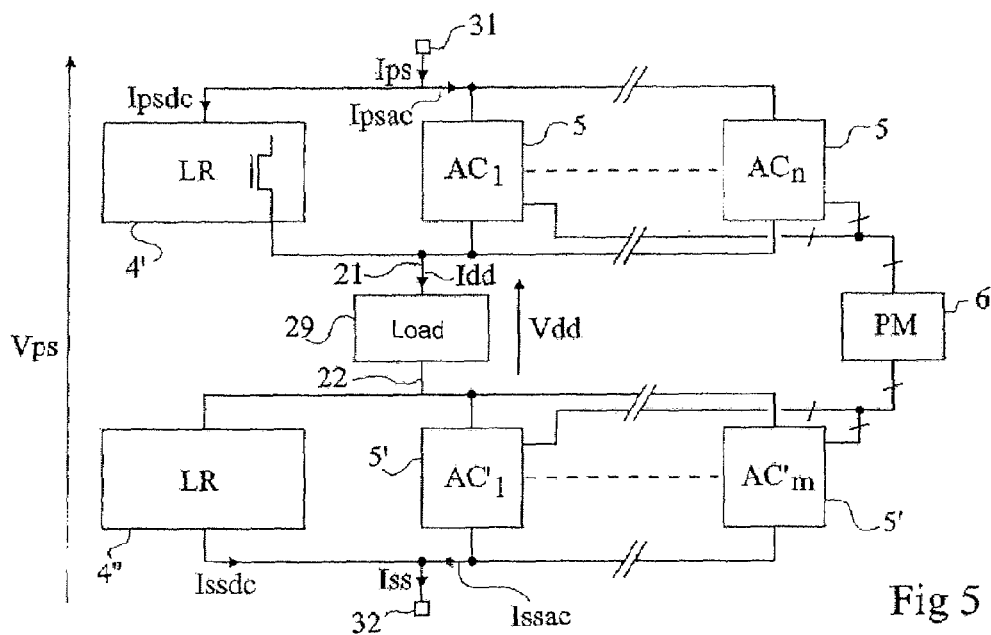
FIG. 5 shows an embodiment of circuits for supplying a load and for scrambling its ground current according to the present invention.

FIG. 5 very schematically shows in the form of blocks an embodiment of an integrated circuit according to the present invention having a load 29 (L) receiving a regulated supply voltage Vdd from a voltage Vps applied between two terminals 31 and 32 of the integrated circuit.

A linear regulator 4' (LR) is connected in parallel with one or several (n) circuits 5 (AC1, ... ACn) with one or several switched capacitances between terminal 31 and terminal 21 of application of the positive potential of voltage Vdd on load 29. Similarly, a linear regulator 4" is connected in parallel with one or several (m) circuits 5' (AC'1, ..., AC'm) with one or several switched capacitances between ground terminal 22 of load 21 and terminal 32 of application of the reference potential (external ground) of voltage Vps. Finally, a circuit 6 (PM) generates control signals for the different circuits 5 and 5' according to the power consumption of load 29 and, preferentially, to the internal circuits which are used.

Figure 6:
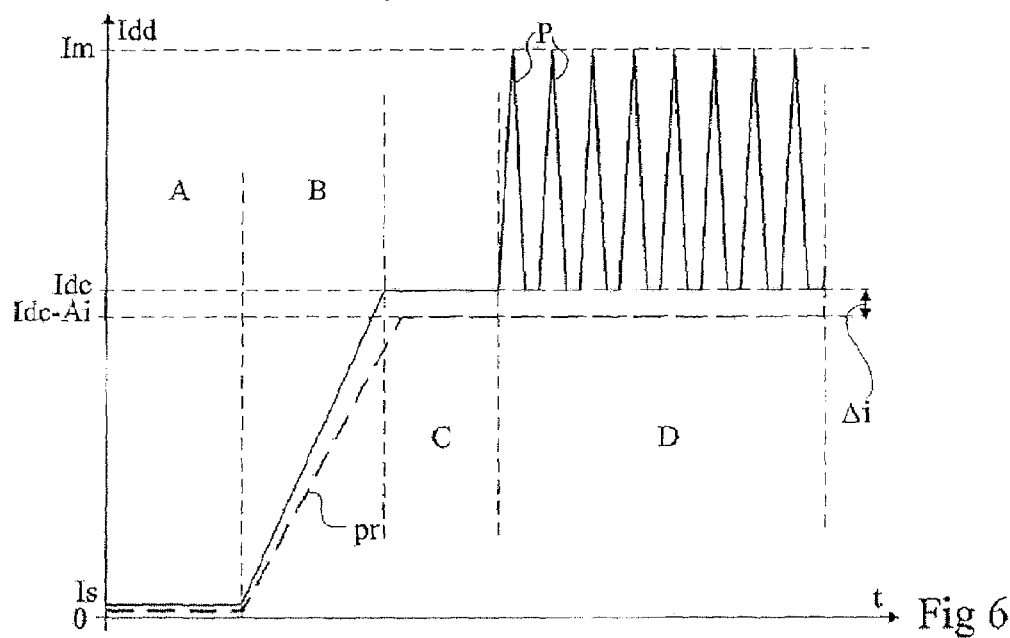
FIG. 6 is a timing diagram representing the current in the load of the supply circuit of FIG. 5.

FIG. 6 is a timing diagram illustrating, out of scale, examples of shapes of current Idd in load 29 along time. For simplification, four successive phases A, B, C, and D have been illustrated in FIG. 6 and respectively correspond to a standby phase, a starting phase (end of standby), a phase in which no critical calculation is performed, and a phase of critical algorithmic calculations from the point of view of current security.

At standby (phase A), current Idd has a minimum value Is. Current Is is, preferably, provided by the linear regulator and at least one switched-mode circuit (with switched capacitances).

In starting phase B, linear regulator 4' provides the most part of the necessary current until the total current reaches, for example, a level Idc corresponding to the average stable current consumption level of the circuit (phase C).

With respect to this current Idc, when operations are executed by the integrated circuit (phase D), abrupt variations of current Idd can be observed (peaks p in FIG. 6) up to a level Im corresponding to the maximum current. For simplification, all peaks p have been shown with the same amplitude. In practice, the amplitude and the frequency of the peaks depend on the executed calculations. The current range between values Idc and Im corresponds to the range in which the current signature of the calculations executed by the integrated circuit is present on current Idd.

The present invention takes advantage from the fact that the supply current of an integrated circuit executing algorithmic-type calculations can be split up in two. A first so-called D.C. portion of the current varies little along time. This current contains little sensitive data and represents the most part of the total consumed power. A second so-called A.C. portion of the current varies rapidly along time under the effect of switchings of the logic calculation circuits and forms the most part of the current signatures of the calculation algorithms.

It thus becomes possible to use structures with switched capacitances while remaining compatible with an integration on a same chip as the load and with miniaturization needs. Typically, the ratio between the low-variation power and the fast-variation power ranges between 5 and 30%. Capacitances on the order of one nanofarad are then sufficient and become acceptable at the surface.

The switched-capacitance circuits may be switched-capacitance step-down converters, choppers, and more generally any switched-mode power supply with no inductive element.

According to the first aspect of the present invention, at least during phase D, the power is provided not only by linear regulator 4' but also by capacitive switched-mode power supply circuit(s) 5. Current Ips is then divided between a current Ipsdc absorbed by linear regulator 4' and a current Ipsac absorbed by the switched-mode circuits. Current Ipsac is decorrelated from current Idd in load 29.

Preferably, a portion ΔI of current Idc is provided by at least one switched-mode power supply circuit. This margin enables compensating for the latency time of the relatively slow regulation loop of regulator 4'. This prevents any fast variation data leakage of the current on the slow variation channel.

In a first embodiment, at least one switched-mode circuit is activated at the end of the starting phase and the linear and switched-mode regulations remain combined in phases C and D.

In a second preferred embodiment (dotted lines pr in FIG. 6), at least one (high-efficiency) switched-mode circuit is permanently activated. Quantity ΔI is then proportional to the current consumed in phases A and B.

An advantage of this preferred embodiment is that the circuit is protected even in case of a current signature exploitable in the standby state.

Another advantage is that the general efficiency is improved.

The greater quantity ΔI, the more space is taken up by the switched-capacitance circuits. A compromise will then be searched between the circuit surface area and the acceptable security margin.

According to the second aspect of the present invention, a linear regulation and a ground current switched-mode regulation are combined at least during phases C and D and preferably permanently. Thus, current Iss is divided between a current Issdc provided by linear regulator 4" and a current Issac provided by capacitive switched-mode circuits 5'. Current Issac is decorrelated from the current coming out of pad 22 of load 21 by being "chopped" by circuit(s) 5'.

In the embodiment of FIG. 5, the two aspects of the present invention are combined.

Figure 7:
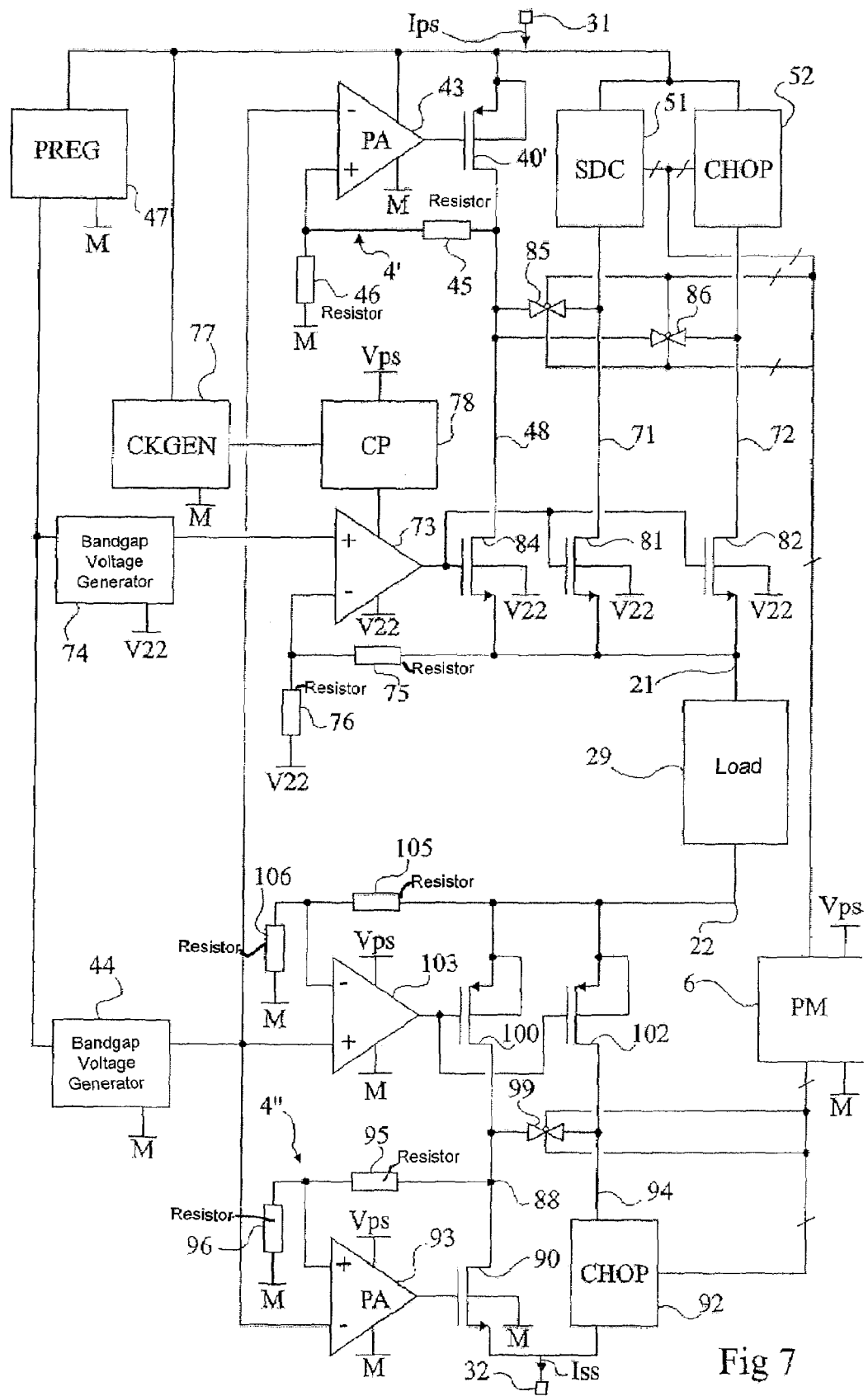
FIG. 7 very schematically shows in the form of blocks an embodiment of a circuit of load supply and of scrambling of its ground current according to the present invention.

FIG. 7 shows an embodiment of an integrated circuit according to the present invention. In this example, a first switched-capacitance circuit 51 of step-down converter type (SDC) is in parallel with a second capacitive switched-mode power supply circuit 52 of chopper type (CHOP), the two circuits forming the fast channels.

According to this embodiment, linear regulator 4' is based on a P-channel MOS transistor 40'. Transistor 40' has its source and its bulk directly connected to terminal 31 and is controlled by a transconductance and adaptive biasing (PA) amplifier 43, supplied by voltage Vps. Two resistors 45 and 46 form a dividing bridge between the drain of transistor 40' and ground M having its midpoint connected to the measurement input (for example, inverting) of amplifier 43. The reference input (for example, inverting) of amplifier 43 is connected to the output of a first circuit 44 (BG) of generation of a reference voltage (bandgap) from voltage Vps. In practice, circuit 44 is supplied by a preregulator 47 (PREG) of voltage Vps (in the previous drawings, this preregulator has been assumed to be comprised within block 44). Such a preregulator is in practice a linear regulator.

The use of an adaptive biasing amplifier enables filtering the fast variations (thus avoiding the current signatures) while improving the efficiency by regulating the biasing on the slow-variation current surges (of significant amplitude).

Preferably, a fast linear regulator (with respect to regulator 4') with a low series voltage drop (LDO) is interposed between circuits 4', 51, and 52 and supply terminal 21 of load 29. Outputs 48, 71, and 72 of circuits 4', 51, and 52 are connected to the respective sources of three N-channel MOS transistors 84, 81, and 82 of the fast regulator. Transistors 81, 82, and 84 are controlled by a same signal provided by a fast amplifier 73, supplied by a charge pump circuit 78 (CP) (optional). Circuit 78 is controlled by a circuit 77 of generation of a clock (CKGEN) supplied by voltage Vps. Circuit 78 receives the positive potential of voltage Vps of terminal 31. The function of charge pump circuit 74 is to provide a sufficient voltage to the biasing of transistors 81, 82, and 84 for the case where voltage Vps is not sufficient by itself.

The reference input (for example, non-inverting) of amplifier 73 is connected to the output of a second circuit 74 (BG') of generation of a reference voltage (bandgap) supplied by preregulator 47. Its measurement input (for example, inverting) is connected to the midpoint of a dividing bridge formed of two resistors 75 and 76 in series between the sources of transistors 81, 82, 84 connected to positive supply terminal 21 of load 29 and its ground 22 (potential V22). The ground terminals of amplifier 73 and of circuit 74, as well as the bulks of transistors 81, 82, and 84, are connected to terminal 22, that is, to ground V22 of the load. Since transistors 81, 82, and 84 are controlled by a same signal, their respective sizes are adapted to the currents that they are likely to convey.

The fact for transistor 40' to have a P channel and for transistor 84 (and transistors 81 and 82) to have an N channel insulates point 21 from point 31.

The fast regulation loop based on amplifier 73 enables stabilizing supply voltage Vdd against the variations of the intermediary voltages (nodes 48, 71, and 72), of internal power supply current Idd, and of the temperature.

The fast regulation loop may possibly be omitted in case of a stable supply voltage Vps and of a stable power consumption of the load.

Preferably, sources 71 and 72 of transistors 81 and 82 are connectable, by switches 85 and 86, to drain 48 of transistor 84. As a variation, these switches are simple wires or resistors. The function of switches 85 and 86 is to balance power transfers between regulation channels.

Switches 85 and 86 as well as circuits 51 and 52 are controlled by circuit 6 (PM) supplied by voltage Vps (ground M). Circuit 6 is, for example, a circuit for managing the load clock or an independent circuit dedicated to the control function. Preferably, control circuit 6 is the microcontroller of load 29 and is thus comprised therein (and thus supplied with voltage Vdd). The control of the capacitances of circuits 51 and 52 may be, for example, synchronized with the clock of the processor comprised by the load microcontroller to reduce the amplitude of the variations of the supply circuit internal nodes. As a variation, this control is performed to generate factitious signatures on current Ips.

The margin (Δi, FIG. 6) between the use of the linear and switched-mode regulations is set by the regulation loop based on amplifier 43 and especially by resistors 45 and 46.

On the side of the ground current of load 29, linear regulator 4" is formed of a transconductance adaptive-biasing (PA) operational amplifier 93, controlling an N-channel MOS transistor 90 having its drain and substrate connected to terminal 32 (ground M). Amplifier 93 is supplied by voltage Vps and receives (for example, on its inverting input) the reference voltage provided by circuit 44. Its measurement input (for example, non-inverting) is connected to the midpoint of a dividing bridge formed of resistors 95 and 96 in series between source 88 of transistor 90 and ground M.

The ground current switching element is, for example, a chopper 92 (CHOP) having an input terminal 94 connectable by a switch 99 to node 88 and having its output terminal directly connected to terminal 32. Circuit 92 and switch 99 are controlled by circuit 6.

Preferably, nodes 88 and 94 are individually connected to the respective drains of two P-channel MOS transistors 100 and 102 of a fast linear regulator (with respect to regulator 4") with a low series voltage drop. The sources and substrates of transistors 100 and 102 are interconnected to ground output terminal 22 of load 29. The transistors are controlled by a transconductance amplifier 103 supplied by voltage Vps and having its reference input (for example, non-inverting) receiving the voltage provided by circuit 44. The measurement input (for example, inverting) of amplifier 103 is connected to the midpoint of a dividing bridge formed of two resistors 105 and 106 in series between terminal 22 and ground M. Since transistors 100 and 102 are controlled by the same signal, their respective sizes are adapted to the currents that they are likely to carry.

It can be seen that node 22 is made floating with respect to ground 32, which results from the decorrelation of output current Iss with respect to the current in load 29. As for the rest, the operation and the regulation between the different branches are performed similarly to that previously discussed in relation with the positive portion of the power supply.

Figure 8:
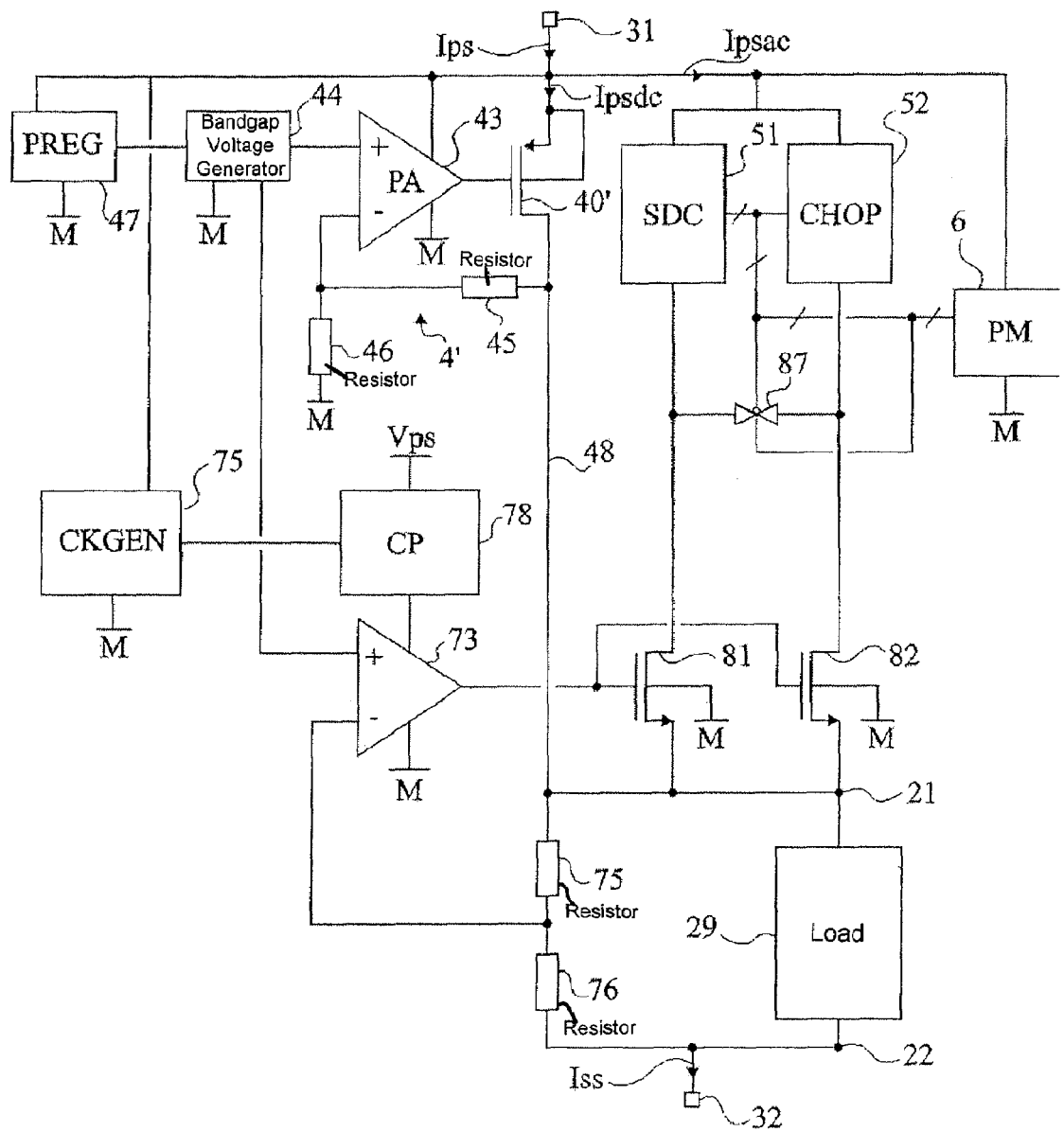
FIG. 8 shows a preferred embodiment of a load supply circuit according to the first aspect of the present invention.

FIG. 8 shows a preferred embodiment of a circuit according to the first aspect of the present invention in which at least the positive portion of the power supply is scrambled. A structure similar to that described in relation with FIG. 7 can be found again between terminals 31 and 21, on the positive supply side. A difference is that, since terminals 22 and 32 are confounded, amplifier 73 and the bulks of transistors 81 and 82 are connected to ground M of external voltage Vps. Further, a single circuit 44, referenced to ground M, is sufficient.

If switches 85 and 86 of FIG. 7 (not shown in FIG. 8) are provided, the circuit only scrambles the positive portion of the power supply. For scrambling ground, internal ground 22 has to be differentiated from external ground M as in the previous circuit of FIG. 7, to perform a regulation between terminal 22 and terminal 32. However, if switches 85 and 86 are omitted or, as shown in FIG. 8, replaced by a switch 87 connecting outputs 71 and 72, and provided that the load presents a capacitance (at least parasitic) between its terminals, the circuit then also scrambles ground without requiring the regulation of FIG. 7. Indeed, the outputs of circuits 51 and 52 are independent from the output 48 of the linear regulator. Then, the internal capacitance of circuits 51 and 52 will charge and discharge only with the A.C. portion of the current. A.C. power consumption of the load then only occurs in internal loops during discharge of the output capacitances of circuits 51 and 52. Terminal 32 only receives the D.C. portion of the current from the load 29. This provides equivalence in currents Ips and Iss on terminals 31 and 32 in term of activity signature of the load. This result comes from the internal schemes of switched-capacitance circuits providing a capacitive element between their output and ground M, as it will better understood later in connection with FIGS. 10 & 11.

FIG. 8 further illustrates a variation of the present invention in which the fast regulator based on amplifier 73 only controls transistors 81 and 82 of the switched-mode branches, output 48 of the linear regulator being directly connected to node 21. Such a variation makes the regulation loop faster still but less isolates the linear regulation (and thus voltage Vps) from the fast variations.

Figure 9:
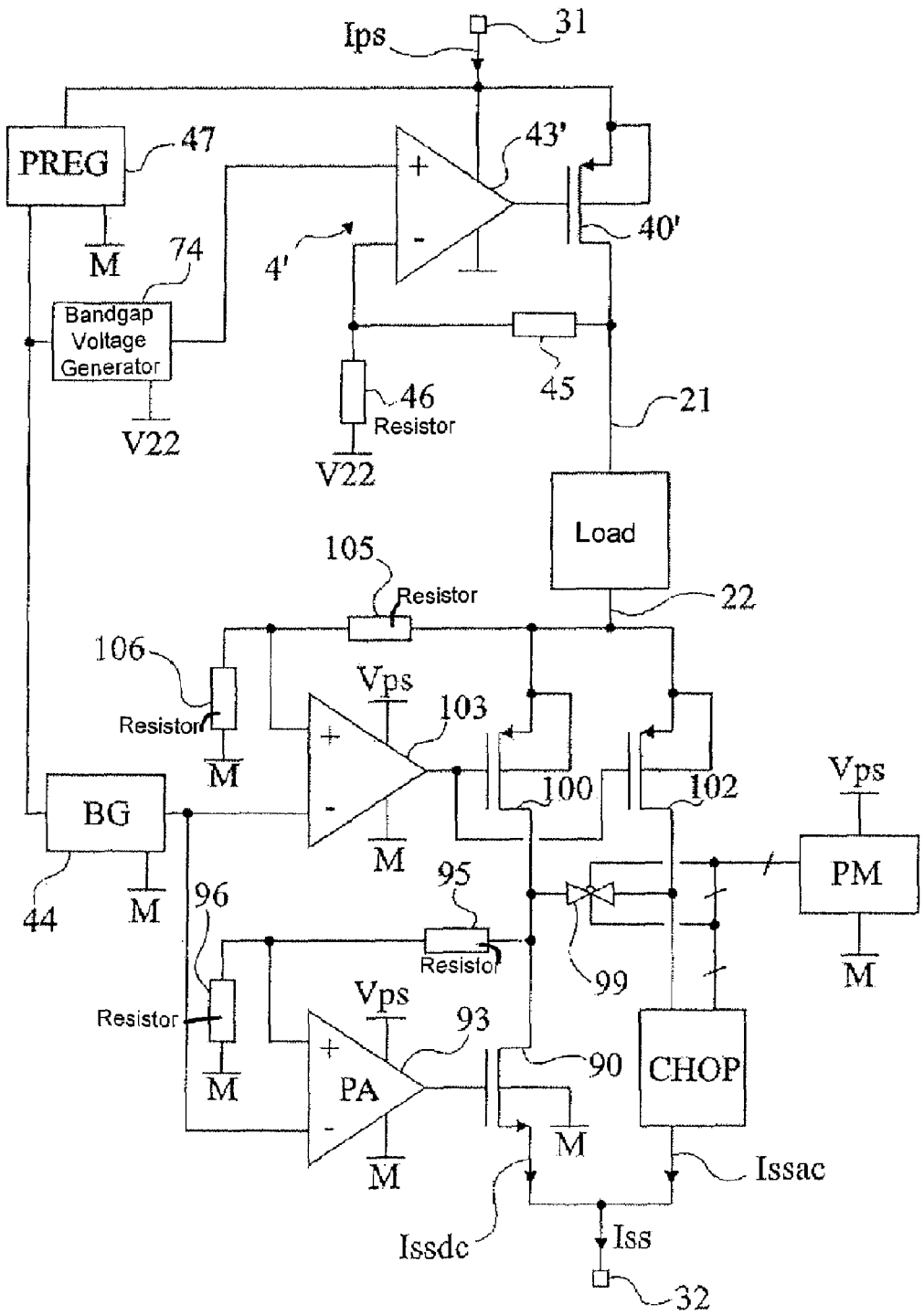
FIG. 9 shows a variation of the ground current scrambling circuit according to the second aspect of the present invention.

FIG. 9 shows another simplified embodiment according to the second aspect of the present invention in which only the ground current portion Iss of the circuit is scrambled by being distributed between a linear regulation and a capacitive switched-mode power supply. On the side of supply current Ips, only one linear regulator 4' of the type illustrated in FIG. 7 is used, resistor 46 being connected to (floating) ground 22 of load 29 and not to external ground M, the non-inverting input of amplifier 43' (with no adaptive biasing) receiving a reference provided by a circuit 74 (BG') referenced to voltage V22. Between load 29 and external ground M, the structure described in relation with FIG. 7 can be found again.

For an implementation on the ground side, an integrated circuit technology enabling differentiation of the ground node from the bulk node to provide the adapted biasings to the substrates of the different transistors must be available. For example, such integrated circuits can be formed in a technology of Flash-type (with triple wells), of epitaxial BICMOS type, or in technologies of silicon-on-insulator type (SOI), etc.

Figure 10:
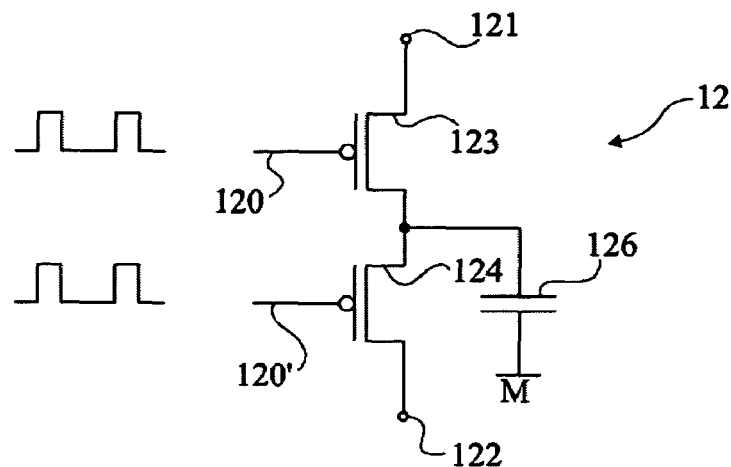
FIG. 10 shows in simplified fashion an example of a chopper usable in supply and scrambling circuits according to the present invention.

FIG. 10 shows a simplified structure of a switched-capacitance circuit of chopper type 12. Input-output terminals 121 and 122 of the chopper are connected by two P-channel MOS transistors 123 and 124 in series having their gates 120 and 120' receiving non-overlapping phase control signals. The junction point of transistors 123 and 124 is connected to a first electrode of a capacitor 126 having its other electrode connected to ground M. When the control signal is low, transistor 123 conducts while transistor 124 is off and capacitor 126 charges. When the control signal is high, the capacitor discharges through transistor 124, transistor 123 being blocked.

Figure 11:
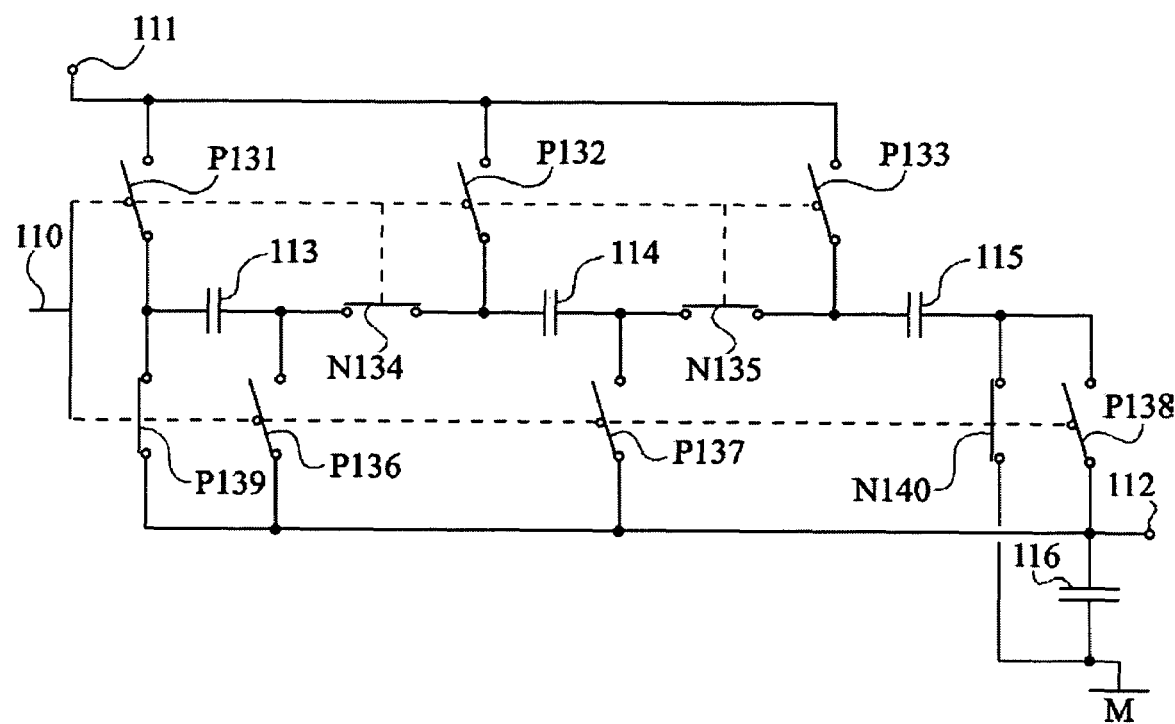
FIG. 11 schematically shows an example of a step-down converter with switched capacitances usable in supply and scrambling circuits according to the present invention.

FIG. 11 shows an embodiment of a switched-capacitance step-down converter 11 of the type used for circuit 51 (FIGS. 7 and 8). The principle is to connect capacitors 113, 114, and 115 for a charge in parallel by a current entering a terminal 111 of the circuit and for a discharge in series by a current coming out from a terminal 112, a fourth (output) capacitor 116 connecting terminal 112 to ground. Three switches P131, P132, and P133 connect terminal 111 to a first respective electrode of capacitors 113, 114, and 115 and three switches P136, P137, and P138 connect their second respective electrodes to terminal 112. Two switches N134 and N135 are respectively interposed between capacitors 113 and 114 and between capacitors 114 and 115. Finally, two switches P139 and N140 respectively connect the first electrode of capacitor 113 to terminal 112 and the second electrode of capacitor 115 to ground. For example, switches P131, P132, P133, P136, P137, P138, and P139 are P-channel MOS transistors and switches N134, N135, and N140 are N-channel MOS transistors. The switches are controlled by a signal applied on an input 10 of the circuit (or two signals with non-overlapping phases to avoid any risk of simultaneous conduction on switchings). In discharge phases, switches P131, P132, P133, P136, P137, and P138 are off and switches N134, 135, P129, and N140 are on. Capacitors 113, 114, and 115 are thus in series between terminal 112 and the ground, and this series association is in parallel with capacitor 116. In charge phases, switches P131, P132, P133, P136, P137, P138 are on and switches N134, N135, P139, and N140 are off. Capacitors 113, 114, and 115 are thus in parallel between terminals 111 and 112, and this parallel association is in series with grounded capacitor 116.

The selection between a switched-capacitance step-down converter and a chopper depends on a priority between a low voltage drop and a higher current. The advantage of the chopper is that it generates a lower voltage drop and that it takes up less space. Its efficiency is however limited. The advantage of a switched-capacitance step-down converter is to provide a greater current and thus to improve the efficiency. On the positive supply side, the fact of combining both solutions enables optimizing the system, for example, by assigning the switched-capacitance circuit to a calculation phase relatively power-greedy with respect to another calculation phase to which the chopper is assigned. On the ground side, the switched-mode circuits will preferentially be of chopper type due to their lesser bulk and to the absence of an efficiency need.

An advantage of the present invention is that it enables decorrelating the current signature of an integrated circuit from the algorithmic calculations that it executes while remaining compatible with an integration of reduced bulk.

Another advantage of the present invention is that it enables performing this decorrelation of the current from the load not only on the positive supply side, but also on the ground side.

Another advantage of the present invention is that the permanent use of a switched-mode circuit to provide a portion of the current decreases, as seen from the outside, the total current consumed by the load.

Of course, the present invention is likely to have various alterations, modifications, and improvements which will readily occur to those skilled in the art. In particular, the practical forming of the switched-mode regulation circuits by using tools conventional per se is within the abilities of those skilled in the art based on the functional indications given hereabove.

Further, the selection of the dimensions to be given to these different circuits is also within the abilities of those skilled in the art according to the application. On this regard, it should be noted that different switched-mode circuits may be dedicated to different functions of the load, these circuits being individually controllable according to the processings performed by the load.

Moreover, the security margin $\Delta i$ set by the regulation loop based on amplifier 43 and/or amplifier 93 may be made parameterizable, for example, by providing one or several control registers of a switchable resistor network for resistors 45, 46 and 95, 96, respectively.

Finally, although the present invention has been described in relation with a supply voltage positive with respect to ground, it also applies to a negative supply and such a transposition is within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An integrated circuit having at least one first linear regulator for providing a supply voltage to an internal load from an external voltage, and comprising at least one capacitive switched-mode power supply circuit with one or several switched capacitances, in parallel with the first linear regulator and activated, at least in an operation phase of the integrated circuit, at the same time as the first linear regulator.

2. The circuit of claim 1, wherein said phase corresponds to a phase in which a calculation processor contained by the load is active.

3. The circuit of claim 2, wherein the switched-mode circuit is sized according to the difference in the integrated circuit power consumption between its average power consumption and its power consumption during calculations executed by the processor.

4. The circuit of claim 1, wherein said switched-mode circuit is activated as soon as the current consumed by the load exceeds a threshold.

5. The circuit of claim 1, wherein said switched-mode circuit is permanently active.

6. The circuit of claim 1, wherein a second linear regulator, fast with respect to the first linear regulator, is interposed between a first supply terminal at the load and the respective outputs of the first linear regulator and of the switched-mode circuit.

7. The circuit of claim 6, wherein said first linear regulator comprises a P-channel MOS transistor, in series with a first N-channel MOS transistor of the second linear regulator between a first terminal of application of the external voltage and a first supply terminal of the load, at least one second N-channel MOS transistor of the second linear regulator connecting an output terminal of the switched-mode circuit to said first supply terminal of the load.

8. The circuit of claim 1, wherein the switched-mode circuit comprises several capacitors having their charge organized at least for some of them in parallel and having their discharge organized in series.

9. The circuit of claim 1, wherein the switched-mode circuit is of chopper type.

10. The circuit of claim 1, wherein at least one first additional linear regulator and at least one additional capacitive switched-mode circuit with one or several switched capacitances are interposed between a second supply terminal of the load and a second terminal of application of the external supply voltage.

11. The circuit of claim 10, wherein a second additional linear regulator, fast with respect to the first additional linear regulator, is interposed between the second supply terminal of the load and the respective inputs of the first additional linear regulator and of the additional switched-mode circuit.

12. The circuit of claim 11, wherein said second additional linear regulator comprises a first P-channel MOS transistor), in series with an N-channel MOS transistor of the first additional linear regulator between the second supply terminal of the load and the second terminal of application of the external voltage, a second P-channel MOS transistor of the second additional linear regulator connecting said second supply terminal of the load to an input terminal of the additional switched-mode circuit.

13. A method for scrambling the current signature of a load comprising at least one integrated circuit executing digital processings, consisting of supplying at least the integrated circuit from a supply voltage (Vps) external to the circuit by combining a current provided by a first linear regulator with a current provided by at least one capacitive switched-mode power supply circuit with one or several switched capacitances.

14. The method of claim 13, wherein said currents are combined, at least during a phase where the processor is activated.

15. The method of claim 13, wherein said switched-mode circuit is activated when the current surged by the load exceeds a threshold.

16. The circuit of claim 13, wherein said switched-mode circuit is permanently activated.

* * * * *

UNITED STATES PATENT AND TRADEMARK OFFICE
CERTIFICATE OF CORRECTION

PATENT NO. : 7,375,502 B2
APPLICATION NO. : 11/348792
DATED : May 20, 2008
INVENTOR(S) : Alexandre Malherbe et al.

It is certified that error appears in the above-identified patent and that said Letters Patent is hereby corrected as shown below:

Col. 12, claim 13, line 45 should read:
integrated circuit from a supply voltage external to the Signed and Sealed this Twenty-ninth Day of June, 2010

David J. Kappos
*Director of the United States Patent and Trademark Office*